(No Model.)
S. H. EMMENS.
PROCESS OF AND APPARATUS FOR REMOVING ZINC FROM ZINCIFEROUS ORES.
No. 594,611. Patented Nov. 30, 1897.
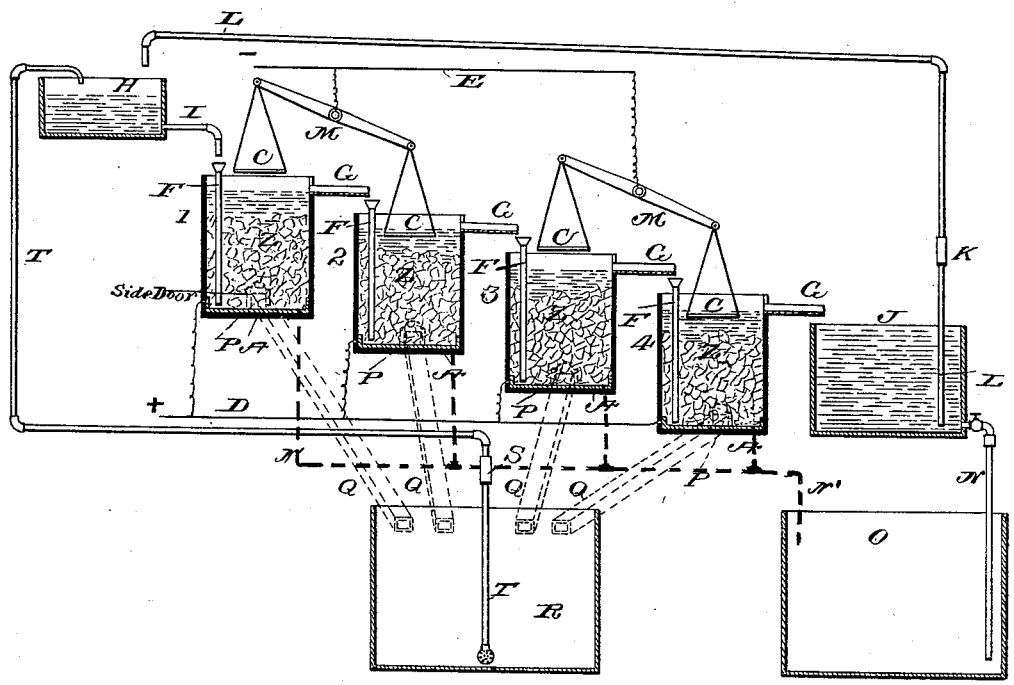

UNITED STATES PATENT OFFICE.

STEPHEN H. EMMENS, OF NEW YORK, N. Y.

PROCESS OF AND APPARATUS FOR REMOVING ZINC FROM ZINCIFEROUS ORES.

SPECIFICATION forming part of Letters Patent No. 594,611, dated November 30, 1897.

Application filed March 6, 1896. Serial No. 582,121. (No model.)

*To all whom it may concern:*

Be it known that I, STEPHEN H. EMMENS, a subject of the Queen of Great Britain, residing in the city of New York, in the State of New York, have invented a new and useful Improvement in Processes of and Apparatus for Removing Zinc from Zinciferous Ores, of which the following is a specification.

This invention relates to the removal of zinc from zinc-bearing ores, and is particularly applicable to the treatment of such ores as contain zinc and lead sulfids—as, for example, the zinc and lead sulfid ores of Broken Hill, in Australia.

The invention consists in an improved process hereinafter set forth and in an electrolytic leaching apparatus for carrying the same into effect, the objects of the invention being to economically remove the zinc contents from such ores, and to this end to subject the crushed and roasted ore to a system of progressive leaching in which the solution remains at all times in contact with the ore and yet becomes alternately acid and neutral or less acid as it travels continuously through the ore.

A sheet of drawings accompanies this specification as part thereof, the figure being a diagrammatic sectional elevation of the leaching apparatus and its appurtenances, and reference will be made to its parts by letters and numbers in the following description.

I carry my process into effect in the following manner:

First. I crush the ore by known means to a suitable degree of fineness, which in most cases may be from twenty to thirty mesh.

Secondly. I subject the crushed ore to a roast in a reverberatory furnace, which may be of known construction, the temperature and admission of air being so regulated as to convert the zinc sulfid or other zinc mineral present into zinc sulfate without decomposing any considerable proportion of such sulfate.

Thirdly. I provide a series of vats, (represented at 1, 2, 3, and 4 in the accompanying drawing,) each vat having a sheet-lead or other insoluble anode A at the bottom and a horizontal cathode-plate C of zinc or other suitable metal suspended in the upper portion of the vat. These electrodes are suitably attached to the respective poles of an electric circuit D E, so arranged that an electric current may, whenever desired, be caused to pass from the anodes to the cathodes through the contents of the vats. I also provide each vat with an inlet-pipe F, extending to the bottom of the vessel, and with an exit pipe or trough G, leading from the top of the vat, the respective pipes and troughs being so arranged and connected that a flow of liquid may traverse the entire series of vats in an alternately descending and ascending manner, a storage-tank H discharging through a pipe I into the inlet-pipe F of the first vat and the trough G of the last vat of the series discharging into a receiving-tank J.

Fourthly. I partially fill the vats with the crushed and roasted ore (represented at Z) and cause a flow of water to pass from the storage-tank H through the pipe I and the first inlet-pipe F into vat No. 1, which at the outset is not made part of the electric circuit. The water dissolves the zinc sulfate in vat No. 1 and the solution passes forward by its exit-trough G into vat No. 2, which is at that time made part of the electric circuit. As the liquor rises it passes through the ore, taking up more zinc sulfate, and on reaching the cathode-plate C of said vat No. 2 closes the electric circuit, whereupon a flow of electricity takes place and an electrolytic action is set up, depositing metallic zinc on the cathode and setting free a corresponding quantity of sulfuric acid. The solution thus acidified flows from vat No. 2 into vat No. 3, which is not then part of the electric circuit, and as it rises through the ore becomes neutralized by dissolving some of the zinc oxid and basic zinc sulfate in the ore. It next flows into vat No. 4, which is then part of the electric circuit, where it deposits a further quantity of zinc and again becomes acidified. The flow of the solution thus alternately neutralized and acidified continues through the whole series of vats, which may be more or less numerous. On leaving the last vat it enters the receiving-tank J, from which it is elevated by a pump K or other suitable means to a level from which it flows back into the storage-tank H, being conducted by a pipe or pipes L, and is thus enabled to resume its circulatory travel.

Fifthly. At suitable intervals of time—as, for example, every half-hour—I cut vats 2 4, &c., out of the electric circuit and cause the electric current to pass through vats 1 3, &c., which thereupon become acidifying vessels. This change is preferably effected by suspending each neighboring pair of the cathodes C from the ends of a metallic beam M, pivoted in the center and forming part of the circuit-leg E, connecting the cathode-plates with the negative pole of the dynamo which furnishes the electric current. By turning the beam M on its pivot to a sufficient extent one cathode is depressed into the solution in the vat to which it belongs, and the cathode at the other end of the beam is raised out of the solution in its vat, thereby closing or opening the electric circuit in either vat, as may be desired, and removing the deposited zinc from risk of re-solution in the vat which is cut out of the circuit.

Sixthly. I continue the flow of the solution and the change of the electric current from vat to vat until the metallic zinc deposited and the zinc sulfate in the solution amount together to a quantity showing that the zinc contents of the ore have been removed sufficiently to render the residual ore fit for smelting. The solution is then run off through a pipe or pipes N into a sulfate-tank O, where the zinc may be precipitated by known means as hydrate or crystallized as sulfate or disposed of in any preferred manner.

Seventhly. I open side doors P, with which the vats are provided, and by means of a jet of water I wash the leached ore into sluices Q, leading to a settling-tank R, from which after subsidence the wash-water is elevated by a pump S or its equivalent through a pipe T into the storage-tank A to be used as the leaching solution for a fresh charge of ore. The leached and washed ore is then removed from the settling-tank R and dried, after which it is ready for smelting or for the market.

The leaching-vats 1 2 3, &c., may, as already indicated, be of any required or preferred number. A draining-pipe may extend from the bottom of each vat to the sulfate-tank O, as indicated at dotted lines at N'. Various known substitutes may take the place of the beams M and rising and falling cathodes C for alternately opening and closing the electric circuit through successive vats, and other like modifications will suggest themselves to those skilled in the art.

Having thus described the said process and apparatus, I claim as my invention and desire to patent under this specification—

1. The process of treating zinciferous ores which consists in pulverizing and roasting the ore, leaching it in a series of vessels through which the solution flows continuously, and subjecting the contents of each vessel intermittently to electrolytic action, whereby the solution is rendered alternately acid and neutral or more acid and less acid in contact with each body of ore, substantially as hereinbefore specified.

2. An apparatus for treating zinciferous ores comprising a series of leaching-vats each provided with an inlet-pipe extending to the bottom and with an exit pipe or trough leading from the top of the vat, and each provided at bottom with an insoluble anode, a series of movable cathodes suspended above said vats, means for raising and lowering the cathodes of adjoining vats alternately, and an electric circuit to the respective poles of which said anodes and cathodes are connected, substantially as hereinbefore specified.

STEPHEN H. EMMENS.

Witnesses:
NEWTON W. EMMENS,
WILLIAM MOLLOY.